United States Patent
Aldrich et al.

(10) Patent No.: US 8,175,378 B2
(45) Date of Patent: May 8, 2012

(54) METHOD AND SYSTEM FOR NOISE MANAGEMENT FOR SPATIAL PROCESSING IN DIGITAL IMAGE/VIDEO CAPTURE SYSTEMS

(75) Inventors: Bradley C. Aldrich, Austin, TX (US); Thomas Hartin, Austin, TX (US); Adam George, Austin, TX (US)

(73) Assignee: Marvell World Trade Ltd. (BA)

( * ) Notice: Subject to any disclaimer, the term of this patent is extended or adjusted under 35 U.S.C. 154(b) by 897 days.

(21) Appl. No.: 12/236,075

(22) Filed: Sep. 23, 2008

(65) Prior Publication Data

US 2009/0129695 A1 May 21, 2009

Related U.S. Application Data

(60) Provisional application No. 60/988,276, filed on Nov. 15, 2007.

(51) Int. Cl.
*G06K 9/00* (2006.01)

(52) U.S. Cl. .......................... 382/162; 382/261

(58) Field of Classification Search .......... 382/162–165, 382/167, 190, 254, 261, 270, 274
See application file for complete search history.

(56) References Cited

U.S. PATENT DOCUMENTS

| | | |
|---|---|---|
| 2004/0243659 A1 | 12/2004 | Nikitin |
| 2005/0069207 A1 * | 3/2005 | Zakrzewski et al. .......... 382/190 |
| 2005/0213815 A1 | 9/2005 | Garoutte |
| 2007/0230804 A1 | 10/2007 | Aldrich |

OTHER PUBLICATIONS

PCT International Search Report and Written Opinion of the International Searching Authority, issued Dec. 11, 2008, application No. PCT/US08/77399.

* cited by examiner

*Primary Examiner* — Duy M Dang

(57) ABSTRACT

A computer-implemented method for noise management in a digital image system measures noise levels of pixel data. The noise levels are adjusted with at least one of an intensity gain setting, a spatial gain setting, and a global gain setting to calculate noise adaptive thresholds for use during spatial processing of the pixel data.

26 Claims, 7 Drawing Sheets

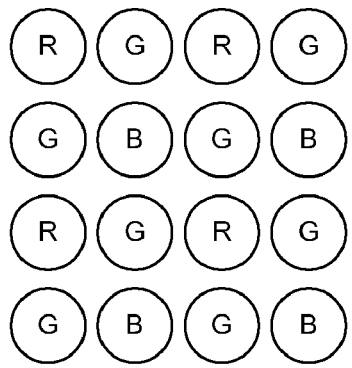 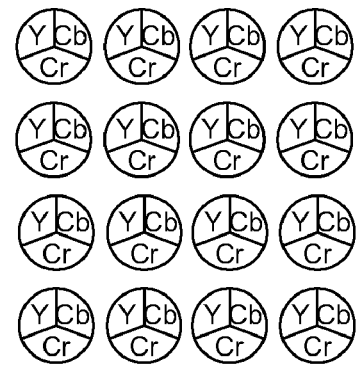
FIG. 2A    FIG. 2B
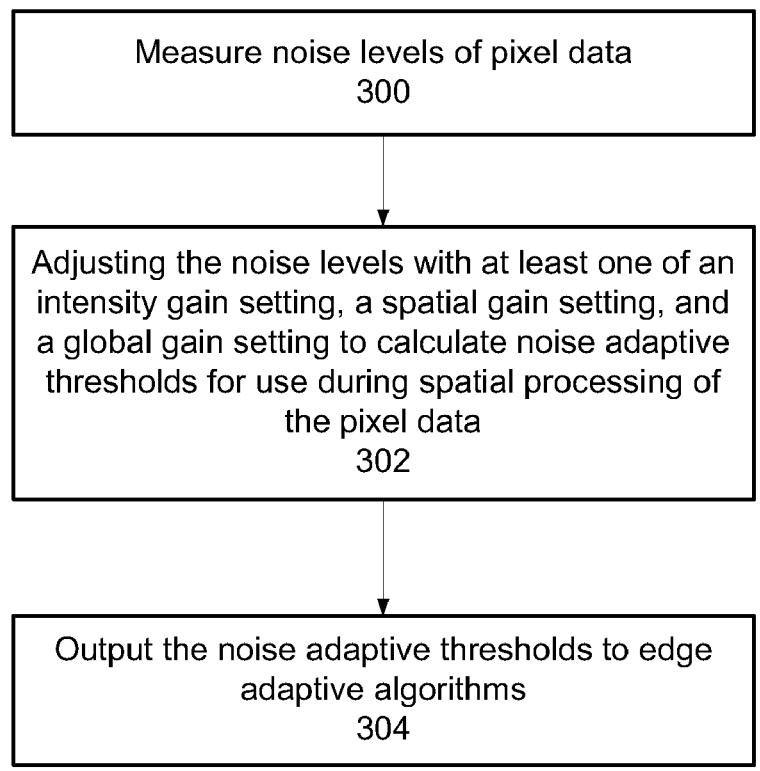
FIG. 3

METHOD AND SYSTEM FOR NOISE MANAGEMENT FOR SPATIAL PROCESSING IN DIGITAL IMAGE/VIDEO CAPTURE SYSTEMS

CROSS-REFERENCE TO RELATED APPLICATIONS

This application claims the benefit of provisional Patent Application Ser. No. 60/988,276, filed Nov. 15, 2007, assigned to the assignee of the present application, and incorporated herein by reference.

BACKGROUND

Over the past few years, the use of CMOS image sensors has proliferated into a variety of user models. The most notable is its acceleration in the consumer handheld imaging space as a standard feature on the mobile phone. As time has progressed, the resolution and quality expectations of the consumer have increased at a remarkable pace. Only a few years ago the presence of a VGA or QSXGA image sensor mobile phone was considered a novelty. In today's market place, expectations are increasing to high megapixel counts in the 3.1 to 5 MP range. All indications are that the resolution will go much higher and solutions which realize 12 to 16 MP will become commonplace. In addition, the expectation is to provide print quality imaging capability competitive in quality to a digital still camera (DSC) and also to capture high quality HD video ready for display on a HD TV.

In order to address the increases in resolution with the form factor restrictions, the sensor manufacturers are aggressively shrinking pixel size. Today, it is common to see pixels with 2.24 um size; in the future the size may drop to as low as 1.1 um and smaller. This reduction in pixel size allows higher megapixels to be achieved in smaller optical formats. However, the reduced active photosites aggravates the signal-to-noise-ratio (SNR) of the sensor and the ability to collect photons and thus operate in coveted lowlight environments effectively.

BRIEF SUMMARY

The exemplary embodiments provide methods and systems for noise management in a digital image system in which noise levels of pixel data are measured. The noise levels are adjusted with at least one of an intensity gain setting, a spatial gain setting, and a global gain setting to calculate noise adaptive thresholds for use during spatial processing of the pixel data. In a further embodiment, the noise adaptive thresholds may be output to edge adaptive algorithms.

Another embodiment provides an executable software product stored on a computer-readable medium containing program instructions for noise management in a digital image system, the program instructions for measuring noise levels of pixel data; and adjusting the noise levels with at least one of an intensity gain setting, a spatial gain setting, and a global gain setting to calculate noise adaptive thresholds for use during spatial processing of the pixel data According to the embodiments disclosed herein, the ability to apply noise adaptive thresholds is provided based on the spatial gain setting due to vignetting correction. By effectively using the noise adaptive thresholds of the exemplary embodiment as an indication of the noise floor, noise sensitive algorithms, such as edge adaptive color synthesis and noise filtering, may adapt as a function of spatial location within an image enabling enhanced image quality for many regions of photospace.

BRIEF DESCRIPTION OF SEVERAL VIEWS OF THE DRAWINGS

FIG. 2A is a diagram illustrating a RAW Bayer pattern.

FIG. 2B is a diagram illustrating an example of luma chroma, i.e., synthesized YCbCr Triads, output at each spatial location by the image signal processor (ISP).

FIG. 3 is a flow diagram illustrating a process for noise management in a digital image system according to an exemplary embodiment.

DETAILED DESCRIPTION

The present invention relates to noise management for spatial processing in digital image/video capture systems. The following description is presented to enable one of ordinary skill in the art to make and use the invention and is provided in the context of a patent application and its requirements. Various modifications to the preferred embodiments and the generic principles and features described herein will be readily apparent. Thus, the present invention is not intended to be limited to the embodiments shown, but is to be accorded the widest scope consistent with the principles and features described herein.

The exemplary embodiments address the complex issue of improving image quality for digital image/video raw processing systems by measuring noise levels in a data stream, adjusting the noise levels with at least a portion of global, spatial, and intensity gain settings to set noise adaptive thresholds, and outputting the noise adaptive thresholds to edge adaptive algorithms for use in spatial processing. The exemplary embodiments thereby manage noise and enable optimum application of noise adaptive processing algorithms.

The exemplary embodiments are mainly described in terms of particular systems provided in particular implementations. However, this method and system will operate effectively in other implementations. For example, the systems, devices, and networks usable with the present invention can take a number of different forms. The exemplary embodiments will also be described in the context of particular methods having certain steps. However, the method and system operate effectively for other methods having different and/or additional steps and/or elements and steps in different orders not inconsistent with the exemplary embodiments.

Figure 1:
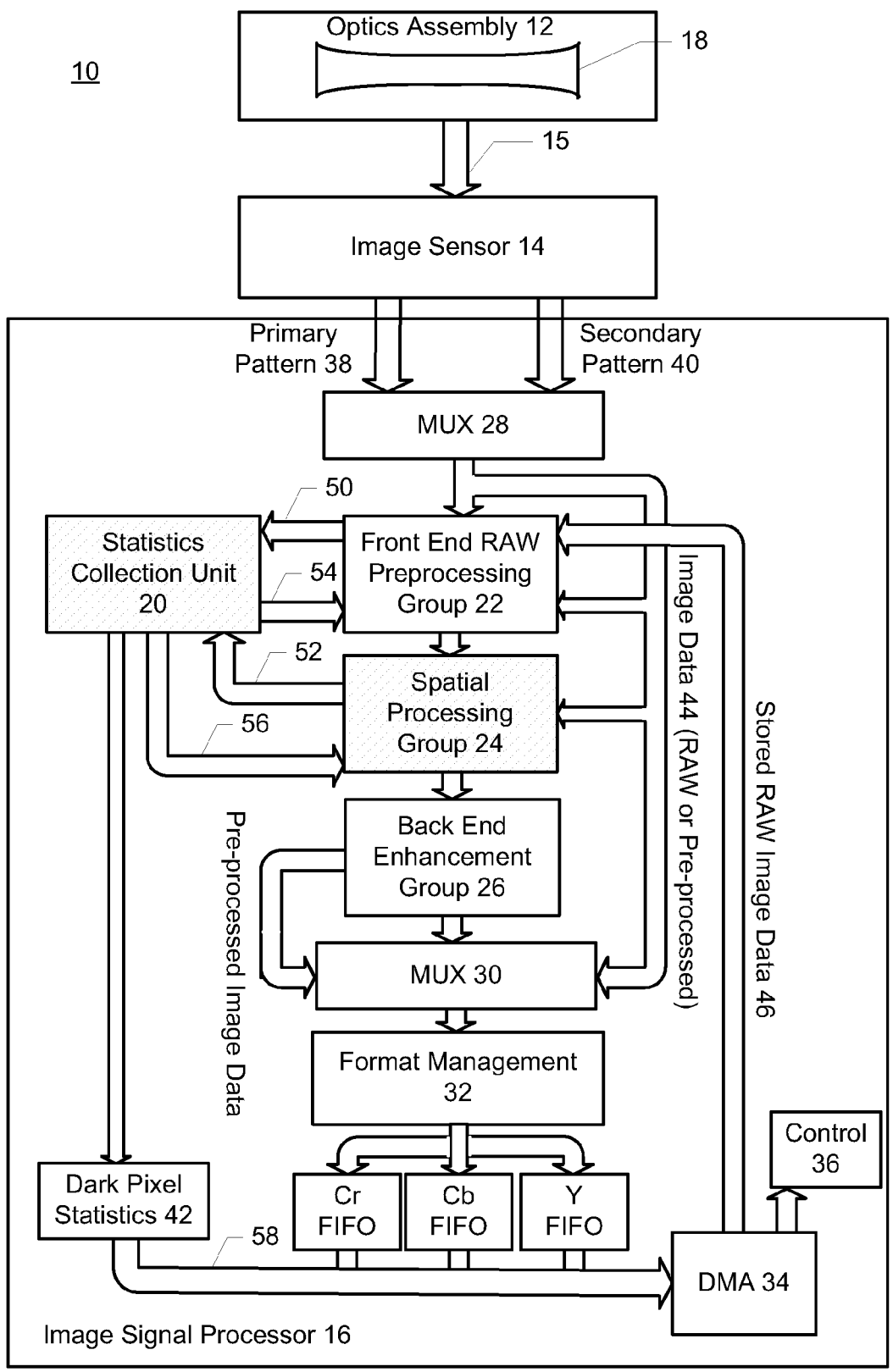
FIG. 1 is a diagram showing an embodiment of a system that may be used to capture and/or process images and/or video sequences.

FIG. 1 is a diagram showing an embodiment of a system 10 that may be used to capture and/or process images and/or video sequences. Such processing may employ one or more noise adaptive thresholds that are based upon noise levels and gain settings associated with the capturing of images.

As shown in FIG. 1, system 10 may include various elements. However, the embodiments are not limited to these elements. In one embodiment, the system 10 may include an optics assembly 12, an image sensor 14, and an image signal processor (ISP) 16. Elements of the ISP 16 may be implemented in hardware, software, firmware, or in any combination thereof. In addition, the functionality of each of the elements may be combined into a lesser or greater number of components.

Optics assembly 12 may include one or more optical devices (e.g., lenses, mirrors, etc.) to project an image within a field of view onto multiple sensor elements within image sensor 14. For instance, FIG. 1 shows optics assembly 12 having a lens 18. In addition, optics assembly 12 may include mechanism(s) to control the arrangement of these optical device(s) For instance, such mechanisms may control focusing operations, aperture settings, zooming operations, shutter speed, effective focal length, etc. The embodiments, however, are not limited to these examples.

Image sensor 14 may include an array of sensor elements (not shown). These elements may be complementary metal oxide semiconductor (CMOS) sensors, charge coupled devices (CCDs), or other suitable sensor element types. These elements may generate analog intensity signals (e.g., voltages), which correspond to light incident upon the sensor. In addition, image sensor 14 may also include analog-to-digital converter(s) ADC(s) that convert the analog intensity signals into digitally encoded intensity values. The embodiments, however, are not limited to this example. Thus, image sensor 14 converts light 15 received through optics assembly 12 into pixel values. Each of these pixel values represents a particular light intensity at the corresponding sensor element. Although these pixel values have been described as digital, they may alternatively be analog.

Image sensor 14 may have various adjustable settings. For instance, sensor elements may have one or more gain settings that quantitatively control the conversion of light into electrical signals. In addition, ADCs of image sensor 14 may have one or more integration times, which control the duration in which sensor element output signals are accumulated. Such settings may be adapted based on environmental factors, such as ambient lighting, etc.

Pixel values generated by image sensor 14 may be arranged into a signal stream, which represents one or more images. Thus, signal stream may comprise a sequence of frames or fields having multiple pixel values. Each frame/field (also referred to as image data) may correspond to a particular time or time interval. In one embodiment, the signal stream is digital. Alternatively, the signal stream may be analog. In addition, image sensor 14 may provide the ISP 16 with sensor information that may include one or more sensor settings, such as sensor element gain(s) and ADC integration time(s).

The ISP 16 includes image processing capabilities. Such capabilities may convert RAW pixel data from the image sensor 14 into red, green, and blue (RGB) or YUV data for display and/or compression. Further, such capabilities may provide image scaling and noise reduction features, as explained further below.

The ISP 16 may comprise four primary algorithm partitions corresponding to a statistics collection unit 20, a front-end RAW preprocessing group 22, a spatial processing group 24, and a back-end enhancement group 26. The ISP 16 may further include a first multiplexer 28, second multiplexer 30, a format manager 32, a direct memory access (DMA) 34, and control registers 36.

Input to the ISP 16 is a stream of RAW data which represents the signal collected from a 2D array of photosites. If a primary pattern 38 is input, then the stream of RAW data may have an interleaved mosaic pattern of Red, Green, and Blue pixels. If a secondary pattern 40 is input, the stream of raw data may have alternating mosaic pattern of Cyan, Magenta, and Yellow. In the majority of sensors, the mosaic pattern used is the Bayer pattern, as shown in FIG. 2A. Note the primary pattern 38 and the secondary pattern 40 are actually indicating the ability to interface the ISP to two different image sensors. In one embodiment, the system 10 may represent a Dual Camera system. The discussion of the CMYG and Bayer patterns above is valid also, but the MUX 28 is intended to allow more than one image sensor 14 to utilize the ISP 16 in the system 10.

FIG. 2A is a diagram illustrating a RAW Bayer pattern. As shown, a Bayer pattern has alternating Red/Green pixels and Green/Blue pixels alternating on the even and odd rows. During processing of the image data, intermediate RGB may be formed into YCbCr.

FIG. 2B is a diagram illustrating an example of corresponding luma chroma, i.e., synthesized YCbCr Triads. In one embodiment, the RGB may be formed into YCbCr 4:4:4 data at 10 or 12-bits precision per channel. The output of ISP 16 processing in one embodiment is the YCbCr triads. In one embodiment, the YCbCr pixel data may be output at 8-bits per channel and in a subsampled chroma space such as YCbCr 4:2:2 or YCbCr 4:20.

Referring again to FIG. 1, the primary pattern 38 or secondary pattern 40 image data 44 is input to multiplexer 28, which then inputs the image data 44 to the front-end RAW preprocessing group 22. In one embodiment, the image data 44 may comprise RAW Bayer data (e.g., 10 or 12-bits), while in an alternative embodiment, the image data 44 may comprise pre-processed image data. Alternatively, in a further embodiment, stored RAW image data 46 may be retrieved from by DMA 34 and input to the front-end RAW preprocessing group 22 for processing, rather than captured image data from the image sensor 14.

The front-end RAW preprocessing group 22 applies several processes/algorithms on the image data 44 that may include dead pixel substitution, black level clamp, linearization, optical vignetting correction and digital white balance. When one or more pixels are identified as defective or "dead", dead pixel substitution attempts to correct for the dead pixels by using adjacent good pixel values for those of the dead pixels. The black level clamp performs an offset to the pixel data by obtaining a mean value and subtracting the mean value from the R, G or B channels as the pixel data are received.

The linearization algorithm corrects for non-linearities in the pixel data by applying an intensity gain setting as a function of intensity level through a linearization function. The linearization function may be implemented as a linearization lookup table (LUT).

Vignetting is a reduction of an image's brightness or saturation at the periphery compared to the image center. The vignetting correction applies a spatial gain setting to the pixel data as a function of a spatial location in the image sensor for the vignetting correction.

The digital white balance performs color correction on the pixel data based on automatic white balance (AWB) and automatic exposure (AE) processes. The digital white balance applies a global gain setting to each of the three R, G and B channels.

At the completion of the algorithms in this sequence, the image data 44 is still in the RAW Bayer space. The front-end RAW preprocessing group 22 may also input dark pixel information to the statistics collection unit 20 via line 50, as explained below.

The statistics collection unit 20 may determine one or more noise levels associated with image sensor 14. This determination may be made in various ways. For instance, the determination may involve calculating dark pixel statistics 42. The dark pixel statistics are associated with intensity values of one or more pixels of the image sensor 14 that are shielded from light by, for example, a metal layer (and therefore referred to herein as dark pixels). Examples of the dark pixel statistics 42 may include a mean value, a standard deviation, and/or a variance. One or more of the dark pixel statistics 42 may be output to the front-end RAW preprocessing group 22 via feedback 54, the spatial processing group 24 via feedback 56 and to DMA 34 via line 58.

According to the exemplary embodiment, the spatial processing group 24 may perform operations that require line buffers or storage capabilities, and adjusts noise levels calculated from the statistics collection unit 20 by the intensity gain setting, the global gain setting, and the spatial gain setting to establish noise adaptive thresholds. The noise adaptive thresholds are then used by edge adaptive algorithms within the spatial processing group 24.

The spatial processing group 24 may perform spatial processing algorithms, such as cross talk reduction (blur reduction), color synthesis (demosaicing), spatial filtering and image scaling. In the spatial processing group 24, it is also desirable to provide for color management to correct for the spectral response characteristics of the color filter array (CFA) and the photodiodes during color correction. The color correction allows the conversion of the image data following color synthesis which is in the camera RGB color space, (cRGB), into a standard color space such as sRGB. In addition, a color management unit may combine a matrix operation to move the image data into a linear chroma luma color space to facilitate the application of an edge boost or chroma denoising algorithms.

To facilitate the auto exposure (AE), auto white balance (AWB), and auto focus (AF) processes within the camera system, the spatial processing group 24 may input data to the statistics collection unit 20 via line 52. This data may also be read thru DMA 34 in a similar fashion as the dark pixel statistics 42.

The back-end enhancement group 26 finishes processing of the pixel data prior to presentation to display or compression resources. The back-end enhancement group 26 may include both color management capabilities, such as color space conversation, color space saturation and hue adjustments, and the ability to perform gamma correction or tone mapping functions. The back-end enhancement group 26 inputs image data processed through the front-end processing group 22 and the spatial processing group 24 into multiplexer 30. The multiplexor 30 may receive as input pre-processed image data, in addition to, or instead of, the raw image data 44.

The format manager 32 formats YCbCr image data and outputs the chroma Y into a Y FIFO queue, outputs the Cb into a Cb FIFO queue, and outputs the Cr into a Cr FIFO queue. The three queues are output to the DMA 34, which may be coupled to a system bus. The system bus allows the data to be presented to memory resources. The DMA is also coupled to control registers 36. The control registers 36 may be used to setup various resources within the ISP such as tables for the vignetting correction 414, linearization LUT 412 and the gain settings for the digital white balance 416 . . . . The control registers 36 setup components in the ISP from the statistics unit to the final out processing through the format management unit.

FIG. 3 is a flow diagram illustrating a process for noise management in a digital image system according to an exemplary embodiment. The process includes measuring noise levels of pixel data (block 300). In one embodiment, the noise levels of the pixel data may be measured by calculating the dark pixel statistics 42 associated with dark pixel values of the image sensor 14. As stated above, examples of the dark pixel statistics 42 may include a mean, a mean deviation, a standard deviation, and/or a variance of the dark pixel values.

The noise levels are adjusted by at least one of an intensity gain setting, a spatial gain setting, and a global gain setting, to calculate noise adaptive thresholds for use during spatial processing of the pixel data (block 302). In one embodiment, the intensity gain setting is applied during linearization correction, the spatial gain setting is applied during vignetting correction, and the global gain setting is applied by automatic white balance (AWB) and automatic exposure (AE) algorithms.

In one embodiment, the noise adaptive thresholds may be calculated by combining the dark pixel statistics, the global gain setting, the intensity gain setting, and the spatial gain setting. In the exemplary embodiment, however, the noise adaptive thresholds are calculated by first combining the dark pixel statistics with the global gain setting and the intensity gain setting to create combined noise levels, and then the combined noise levels are multiplied by the spatial gain setting. In one embodiment, a separate combined noise level is calculated for each R, G, and B channel of the pixel data, and a separate noise adaptation threshold is calculated for each R, G, and B channel.

The noise adaptive thresholds may then be output to edge adaptive algorithms (block 304). Examples of edge adaptive algorithms may include cross talk reduction, color synthesis, color management, and edge adaptive spatial filtering. The exemplary embodiments thereby manage noise and enable optimum application of noise adaptive processing algorithms.

Figure 4:
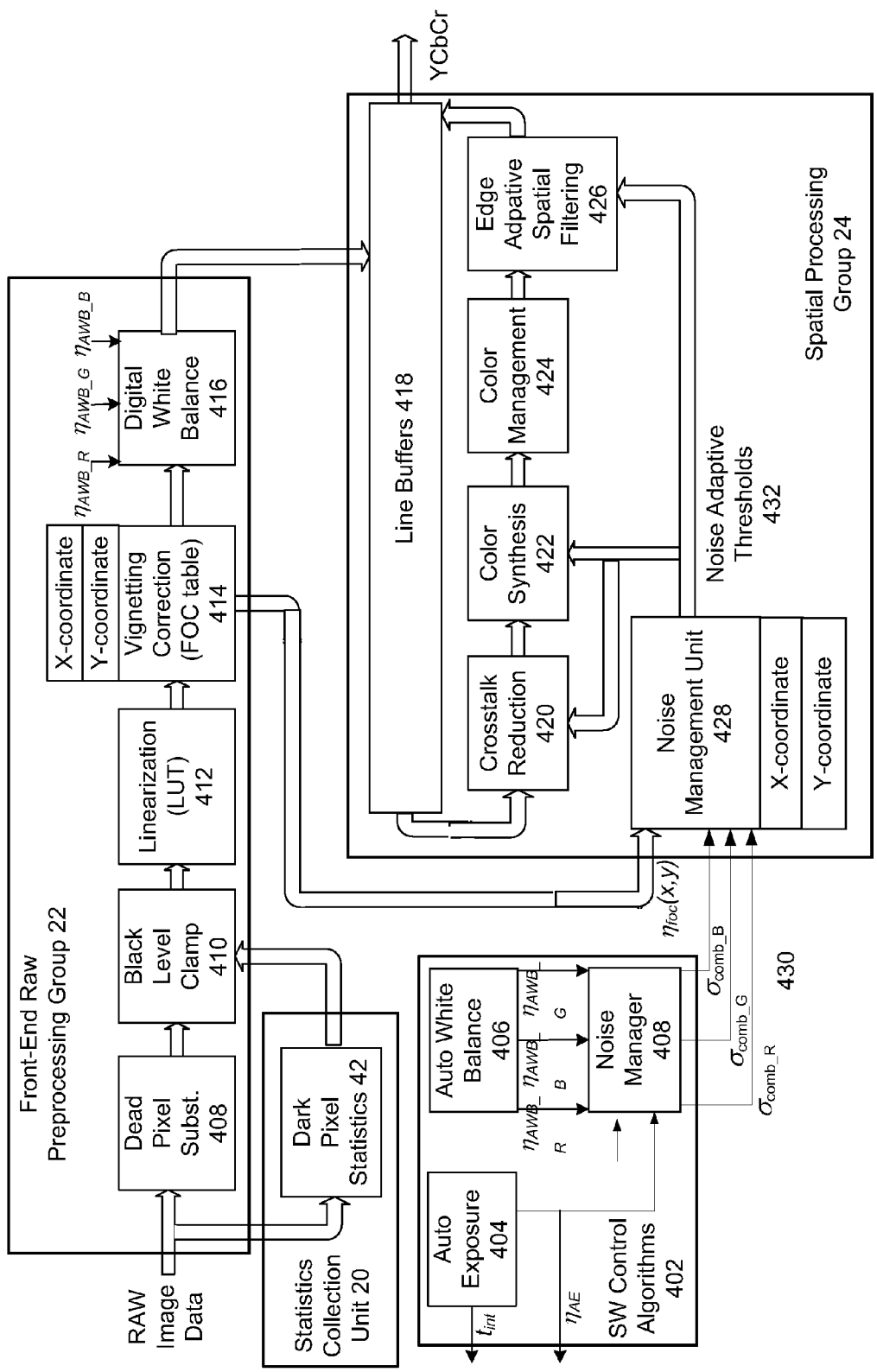
FIG. 4 is a block diagram illustrating a spatial and intensity noise management system, including portions of the ISP in further detail.

FIG. 4 is a block diagram illustrating a spatial and intensity noise management system, including portions of the ISP 16 in further detail, where like components from FIG. 1 have like reference numerals. The spatial and intensity noise management system 400 may include the front-end RAW preprocessing group 22, the statistics collection unit 20, the spatial processing group 24, and software control algorithms 402. The software control algorithms 402 may execute in a processor (not shown) and may include an auto exposure (AE) algorithm 404, an auto white balance (AWB) algorithm 406, and a noise manager 408.

As described above, the front-end RAW preprocessing group 22 may include processes such as dead pixel substitution 409, black level clamp 410, linearization correction 412, vignetting correction 414, and a digital white balance (AWB) algorithm 416. The spatial processing group 24 may include line buffers 418, a noise management unit 428, and edge adaptive algorithms including cross talk reduction 420, color synthesis 422, color management 424, an edge adaptive spatial filtering 426.

Before describing operation of the spatial and intensity noise management system 400, a description of the gains applied to the pixel data is given. The AE and AWB algorithms 404 and 406 are used to adjust the analog gain settings to provide for exposure control and an initial white balance operation. Both of these control algorithms influence the analog gain applied to the RAW image data 44. In one embodiment, the AE algorithm 404 may apply a global gain and the AWB algorithm 406 may apply an AWB channel gain to perform a pre-white balance operation to maximize the signal provided to the A/D within the image sensor 14. The RAW image data 44 after the application of the analog gains is simply the product of the AWB and AE gain settings with the signal level measured at the photo site:

$$R' = \eta_{AWB\_R} \cdot \eta_{AE} \cdot R$$

$$G' = \eta_{AWB\_G1/G2} \cdot \eta_{AE} \cdot G$$

$$B' = \eta_{AWB\_B} \cdot \eta_{AE} \cdot B$$

where, $\eta_{AWB\_RGB}$ represents the AWB gain setting in the analog domain due to the channel gain adjustment for AWB, and $\eta_{AE}$ represents the global gain setting in the analog domain due to the gain adjustment for AE.

Both the global or exposure gain $\eta_{AE}$, and the auto white balance channel gain, $\eta_{AWB\_R}$, $\eta_{AWB\_G}$, and $\eta_{AWB\_B}$, are input to the statistics collection unit 20 as well as to the to the noise manager 408. The AE algorithm 404 also outputs an integration time, $t_{int}$, to the image sensor 14. During operation (e.g., during video sessions), an image sensor's exposure parameters may change as changes in the environment and scene content vary. Examples of such parameters include sensor gain and the integration time (also referred to as exposure integration time). With such changes, the sensor's noise floor may increase or decrease, and along with it, the noise level of the pixel data may increase or decrease and in varying amounts across the image.

One of the first steps in processing RAW Bayer image data 44 is the linearization 412 process. In modern image sensors, the image data 44 is often considered to be quite linear in response, however even small adjustments can be magnified when combined with additional gain settings down stream in the image processing pipe. The effect of applying the linearization 412 is the introduction of an intensity gain or attenuation for a range of digital values output from the image sensor 14. The intensity gain associated with the linearization 412 can be represented as a function of the signal level:

$$R'' = \eta_{lin}(k) \cdot \eta_{AWB\_R} \cdot \eta_{AE} \cdot R$$

$$G'' = \eta_{lin}(k) \cdot \eta_{AWB\_R} \cdot \eta_{AE} \cdot G$$

$$B'' = \eta_{lin}(k) \cdot \eta_{AWB\_R} \cdot \eta_{AE} \cdot B$$

where $\eta_{lin}(k)$ represents the ratio of (value input)/(value output) for a pixel value input of k. The intensity gain associated with linearization of low level signals can be magnified both as a function of control algorithms and the low level signal's spatial position (x, y) within the array.

There are a several sources of distortion and noise that are injected into the image data 44 as a result of imperfections and quality level of the optics used to focus the light onto the array. Two of the most common distortions include vignetting (also known as radial falloff or shadowing) and geometric distortions such as barrel or pincushion effects.

The most common quality problem that is seen with low cost optics is radial falloff or vignetting. The problem manifests itself as less light being collected by the photosites around the periphery of the array as opposed to the center of the array. The shading that appears in the corners of a picture, resulting from inadequate coverage by the lens, and by the weakening of light rays striking border pixels at an angle.

Vignetting correction 414 (also referred to as falloff correction (FOC)) are often applied to correct for this source of image degradation:

$$R''' = \eta_{foc}(x,y) \cdot \eta_{lin}(k) \cdot \eta_{AWB\_R} \cdot \eta_{AE} \cdot R$$

$$G''' = \eta_{foc}(x,y) \cdot \eta_{lin}(k) \cdot \eta_{AWB\_R} \cdot \eta_{AE} \cdot G$$

$$B''' = \eta_{foc}(x,y) \cdot \eta_{lin}(k) \cdot \eta_{AWB\_R} \cdot \eta_{AE} \cdot B$$

where $\eta_{foc}(x, y)$ represents falloff correction or spatial gain setting at position (x, y) in the array. The spatial gain setting may increase asymmetrically from the center of the array to the corners of the array. Spatial gain settings may range from 1× to over 5×.

The digital white balance 416 is applied to the image data usually prior to color synthesis in the RAW Bayer space. Digital white balance 416 is used to adjust the balance of the raw response of the pixels so that white appears white under different illuminants when rendered for a human observer. The digital white balance 416 utilizes statistics in order to evaluate the characteristics of the scene and attempts to estimate the color temperature. The successful estimate of the color temperature will allow the proper channel gains to be identified both in the analog and digital domain. In addition, the identification of the color correction matrix can be accomplished. Once the digital white balance channel gain $\eta_{awb\_R}$ $\eta_{awb\_G}$ $\eta_{awb\_B}$, is applied, the pixel data has five gains applied. Table I summarizes the gain settings applied to the pixel data.

TABLE I

| Domain | Gain | Description | Typical Range |
| --- | --- | --- | --- |
| Sensor Analog Gain | $\eta_{AWB\_R}$ $\eta_{AWB\_G}$ $\eta_{AWB\_B}$ | Channel analog gain from AWB | 0.5 to 2 (GLOBAL) |
|  | $\eta_{AE\_RGB}$ | Global analog Gain from AE | 1 to 32 (GLOBAL) |
| ISP Digital Gains | $\eta_{lin}(k)$ | Linearization Gain | −0.85 to 1.1 (INTESITY) |
|  | $\eta_{foc}(x, y)$ | Spatial gain from RFC | 1 to 5 (SPATIALY) |
|  | $\eta_{awb\_R}$ $\eta_{awb\_G}$ $\eta_{awb\_B}$ | Channel digital gain from AWB | 0.5 to 2 (GLOBAL) |

The gains include analog and digital global gains from the AE algorithm 404 and the AWB algorithms 406 and 416, an intensity gain from linearization 412, and a spatial gain from vignetting correction 414. The five gain settings can be shown mathematically as:

$$R'''' = \eta_{awb\_R} \cdot \eta_{foc}(x,y) \cdot \eta_{lin}(k) \cdot \eta_{AWB\_R} \cdot \eta_{AE} \cdot R$$

$$G'''' = \eta_{awb\_G} \cdot \eta_{foc}(x,y) \cdot \eta_{lin}(k) \cdot \eta_{AWB\_G} \cdot \eta_{AE} \cdot G$$

$$B'''' = \eta_{awb\_B} \cdot \eta_{foc}(x,y) \cdot \eta_{lin}(k) \cdot \eta_{AWB\_B} \cdot \eta_{AE} \cdot B$$

Figure 5:
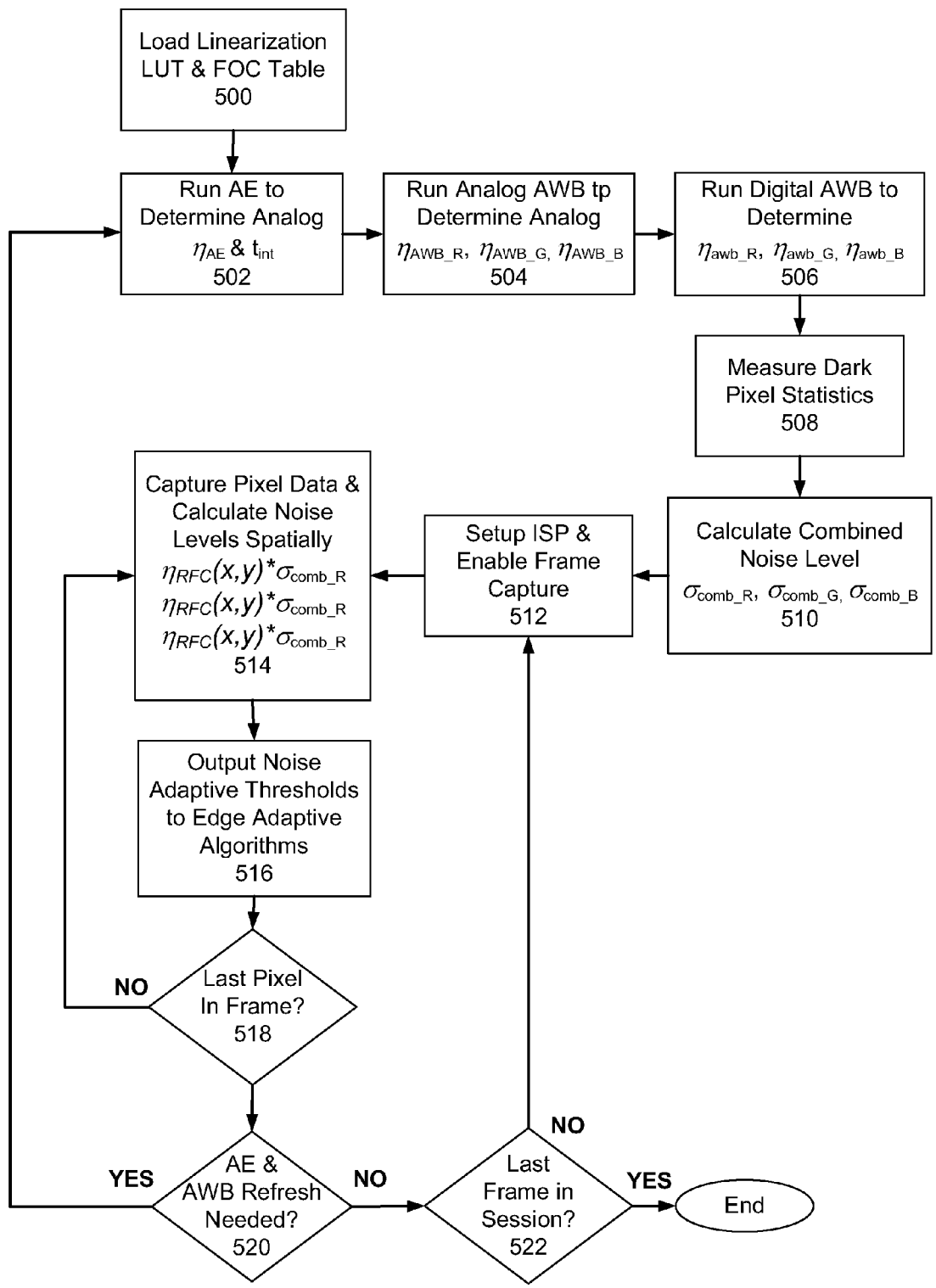
FIG. 5 is a flow diagram illustrating a process for performing noise management that accounts for the multiple intensity, global and spatial gains applied to image data prior to invoking edge adaptive algorithms during spatial processing

FIG. 5 is a flow diagram illustrating a process for performing noise management that accounts for the intensity, global, and spatial gains applied to image data 44 prior to invoking edge adaptive algorithms during spatial processing in accordance with the exemplary embodiment. Referring to both FIGS. 4 and 5, the process may begin by loading a linearization LUT and a falloff correction (FOC) table to enable linearization and vignetting correction 412 and 414, respectively (block 500).

The AE algorithm 404 is run to determine the analog global AE gain $\eta_{AE}$ and integration time, $t_{int}$ (block 502); and the analog AWB algorithm 406 is run to determine the analog global AWB channel gain, $\eta_{AWB\_R}$, $\eta_{AWB\_G}$, $\eta_{AWB\_B}$ (block 504). The digital AWB algorithm 416 is run to determine the digital global AWB channel gain, $\eta_{awb\_R}$ $\eta_{awb\_G}$ $\eta_{awb\_B}$ (block 506).

The dark pixel statistics are 42 then measured (block 508). In one embodiment, the dark pixel statistics 42 may be measured by the statistics collection unit 20.

Before explaining the measurement and calculation of the dark pixel statistics 42, it is important to understand the relationship between noise sources and their manifestation in the output image data. There are a number of different noise sources present within the pixel data stream. The noise source may either be random or contain some structure. The common noise sources of the photo detector include shot noise, 1/f noise, and thermal noise. The pixel array of the image sensor 14 introduces a reset noise and may also include other structural noise sources.

After AWB and AE, a number of noise sources both temporal and fixed are present within the pixel data. These noise sources are amplified when the analog gains are applied and will exist in the digitized image data. In some regions of photospace, the noise may be clearly visible in the produced image, which is to be further compressed and processed for human visual consumption. An image sensor, such as a CMOS sensor for example, has several sources of noise which can act to degrade the signal to noise ratio, (SNR).

Figure 6:
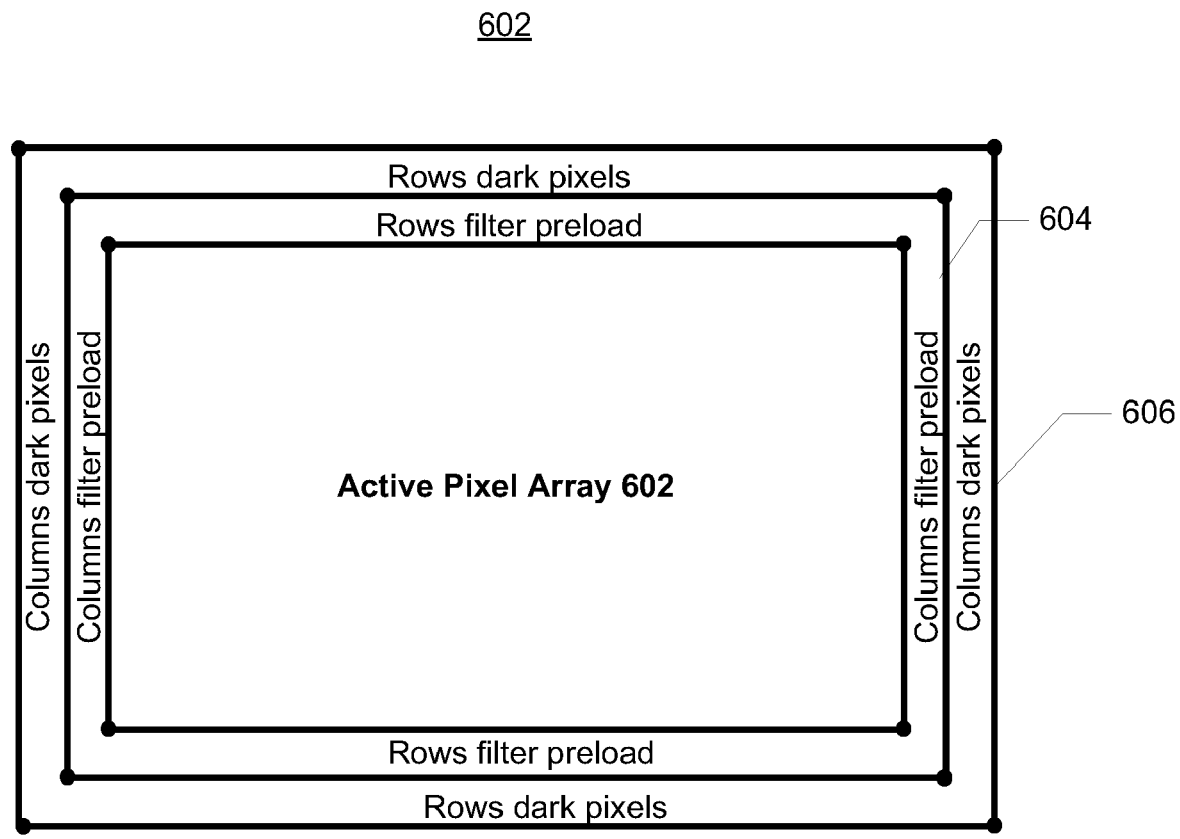
FIG. 6 is a diagram illustrating an image sensor pixel array.

FIG. 6 is a diagram illustrating an image sensor pixel array. The image sensor pixel array 600 includes an active pixel region 602 that is responsive to light, and which is surrounded by a preload pixel region 604 and a dark pixel region 606.

Image sensor array 600 may be an Ultra eXtended Graphic Array (UXGA) having 1620 columns and 1220 rows. As such, active pixel region 602 may have 1600 columns and 1200 rows, preload pixel region 604 may surround active pixel region 602 with 3 unshielded rows and columns, and dark pixel region 606 may surround region 604 with 7 shielded rows and columns. Active pixel region 602 operates as an image capture target. This region includes pixels that are responsive to light. Preload pixel region 604 may include unshielded pixels that are referred to as "pre-filter" pixels. Such pixels may be used for various initialization and image processing operations.

Dark pixel region 606 may include pixels that are shielded from light by, for example, a metal layer. Thus, these pixels (also referred to as reference dark pixels) may be utilized as a reference for determining image sensor noise characteristics.

When the image sensor image array 600 is exposed to light from a scene image, photons hit the image array. As a result, a charge is generated at each CMOS sensor in the array. A portion of each charge is proportional to the photon rate from the scene image. A remaining portion of each charge may be attributed to process inaccuracies that are manifested as various types of noise. These types may include shot noise, fixed pattern noise, analog-to-digital converter (ADC) noise, as well as other on-chip and off-chip noise sources in the image generated by such CMOS sensors. Such noise degrades the quality of sensed images. Such noise contributions can be decomposed, as expressed below:

$$\langle \sigma_{SYS} \rangle = \sqrt{\langle \sigma^2_{SHOT} \rangle + \langle \sigma^2_{DFPN} \rangle + \langle \sigma^2_{RESET} \rangle + \langle \sigma^2_{ON\text{-}CHIP} \rangle + \langle \sigma^2_{OFF\text{-}CHIP} \rangle + \langle \sigma^2_{ADC} \rangle}$$

A simplified approach could represent the noise amplified by the analog gains as a product of the analog gains and the standard deviation of the noise sources:

$$\sigma_{in} = \eta_{AWB\_B} \cdot \eta_{AE} \cdot \sqrt{\langle \sigma^2_{SHOT} \rangle + \langle \sigma^2_{DFPN} \rangle + \langle \sigma^2_{RESET} \rangle + \langle \sigma^2_{ON\text{-}CHIP} \rangle + \langle \sigma^2_{ADC} \rangle}$$

where $\sigma_{in}$ represents a variance of the noise.

The noise sources prior to the RAW image data 44 being presented to the ISP 16 may also include structured noise. These structured noise sources are known as column and row noise and relate to the architecture of the pixel array 600. In the context of the exemplary embodiment, these noise sources and others not identified are assumed to be contained within the image data 44. However, the noise associated with these sources and others may be separately determined.

According to one aspect of the exemplary embodiment, noise levels in the system are therefore measured using the dark pixel statistics 42 by reading the dark rows and columns from the image sensor 14 and calculating the mean and standard deviation.

$$\overline{X}_c = \frac{\sum_{i=0}^{N-1} \text{Dark\_Pixel\_Array}[i]_c}{N}$$

$$\langle \sigma_{SYS} \rangle_c = \sqrt{\frac{\sum_{i=0}^{N-1} [\text{Dark\_Pixel\_Array}[i] - \overline{X}]^2_c}{N-1}}$$

where $\overline{X}$ represents the mean dark pixel value and $\sigma_{SYS}$ represents the dark pixel value standard deviation, N represents a total number of dark pixels used in the calculation, and c represents the Red, Green or Blue channel. The dark pixel statistics may include a standard deviation for each R G and B channel, expressed as $\sigma_R$, $\sigma_G$, and $\sigma_B$, respectively.

The dark pixel statistics 42 may be collected for RAW image data 44. These statistics are used to set the level for the black level clamp 410, and also to establish the thresholds for the edge adaptive algorithms within the spatial processing group 24.

After these dark pixel statistics 42 are calculated in block 508, the noise adaptive thresholds 432 may be calculated. According the exemplary embodiment, the noise adaptive thresholds 432 may be calculated as a product of the dark pixel statistics e.g. the mean and/or the standard deviation), the global gain setting, the intensity gain setting, and the spatial gain settings.

If the data is assumed to be linear, a simplified implementation of the noise management system in one embodiment may calculate the noise adaptive thresholds 432 as a product of the dark pixel statistics, the combined global gain settings, the intensity gain setting, and the spatial gain settings, prior to initiating a still or video image capture.

However, according to the exemplary embodiment, as shown in FIG. 5, combined noise levels 430 are first calculated as a product of the dark pixel statistics, the global gain setting, and the intensity gain setting (block 510) prior to image capture. In one embodiment, the statistics collection unit 20 outputs the dark pixel statistics 42 to the noise manager 408 and the noise manager 408 calculates the combined noise levels 430.

More specifically, the noise manager 408 may calculate the combined noise level for each of the channels, σcomb_R, σcomb_G, σcomb_B, as a product of the global AE gain, the analog and digital AWB gains for each of the channels, the intensity gain, and the standard deviation of the dark pixel values for each of the channels:

$$\sigma_{comb\_R} = \eta_{awb\_R} \cdot \eta_{lin}(k) \cdot \eta_{AWB\_R} \cdot \eta_{AE} \cdot \sigma_R$$

$$\sigma_{comb\_G} = \eta_{awb\_G} \cdot \eta_{lin}(k) \cdot \eta_{AWB\_G} \cdot \eta_{AE} \cdot \sigma_G$$

$$\sigma_{comb\_B} = \eta_{awb\_B} \cdot \eta_{lin}(k) \cdot \eta_{AWB\_B} \cdot \eta_{AE} \cdot \sigma_B$$

After calculating the combined noise levels 430, the ISP 16 is setup and a frame capture is enabled (block 512). Pixel data is then captured and noise levels are calculated spatially by calculating the noise adaptive thresholds 432 (block 514). According to a further aspect of the exemplary embodiment, the noise adaptive thresholds 432 are calculated as a product of the combined noise levels 430 and the spatial gain setting, which occurs after image capture. In one embodiment, the noise adaptive thresholds 432 are calculated by the noise management unit 428. The noise adaptive thresholds 432 are the output to the edge adaptive algorithms of the spatial processing group 24 (block 516).

It is then determined if the last pixel in the frame has been reached (block 518). If the last pixel in the frame has not been reached, then the process continues with capturing pixel data and calculating noise levels spatially (block 514). If It the last pixel in the frame has been reached, then it is determined if AE and AWB refresh is needed (block 520). If AE and AWB refresh is needed, the process continues with running AE (block 502). If AE and AWB refresh is not needed, then it is determined if the last frame in the session has been reached (block 522). If the last frame in the session has been reached, the process ends.

Thus, as shown in blocks 510 through 514, the combined noise levels 430 are calculated as a product of the dark pixel statistics, the global gain setting, and the intensity gain setting prior to initiating a still or video image capture, and then the noise adaptive thresholds 432 are calculated as a product of the combined noise levels 430 and the spatial gain setting.

The ability to apply noise adaptive thresholds based on the spatial gain setting due to vignetting is an important, since variations from the center to periphery have typical values ranging from 1× to 5×. By using the noise adaptive thresholds of the exemplary embodiments as a noise floor, edge adaptive algorithms, such as color synthesis and other noise processing algorithms, will effectively turn-off during spatial processing as a function of location within the field of view (FOV) for many regions of photospace, enhancing image quality.

Referring again to FIG. 5, in one embodiment, the noise adaptive thresholds 432 may be used by edge adaptive algorithms for Noise filtering based on spatial location within the array/pixel data. The noise filtering process can be configured to be aggressive when noise is high in low light conditions (high analog gain AE settings), and configured to be less aggressive when noise is low (i.e., that is, the standard deviation of a uniform filed increases about 3-5× with the center compared to the periphery of the image due to vignetting correction spatial gain, a gain of 16× for the exposure control, and an additional 2-3× due to tone curve mapping). This can be accomplished by varying the spatial width of a median or Gaussian filter class kernel as a function of the noise level or potentially using an edge detection algorithm to also indicate when a smooth region (such as the blue sky) is associated with a pixel, and applying a more aggressive blur spatially using low pass filters of increasing kernel size 426. The noise adaptive thresholds 432 may be used by the edge adaptive algorithms to accurately identify the smooth regions, which requires determining the location of the edges bordering the smooth regions in the image. The noise adaptive thresholds 432 may be used as noise floors by the algorithms such that values over the noise floor can be more readily identified as edges, and therefore not subject to noise filtering, such as blurring.

Figure 7:
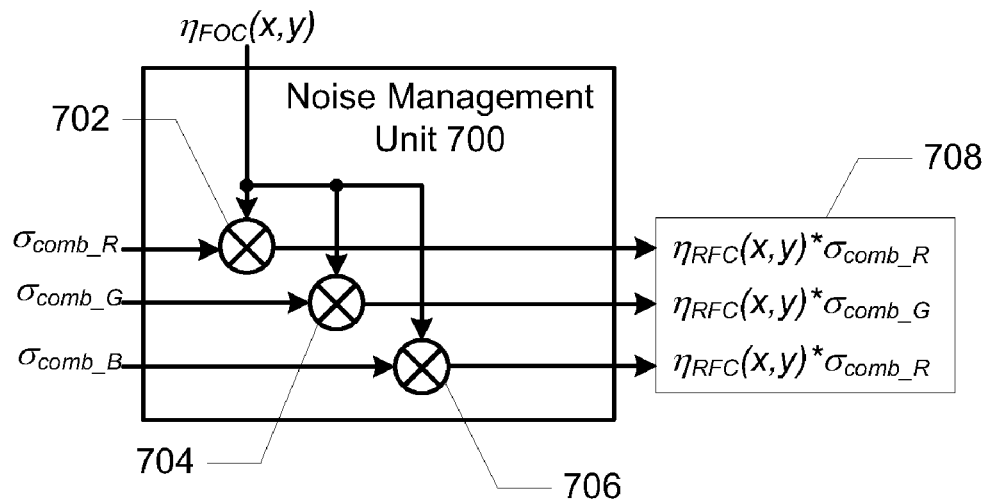
FIG. 7 is a diagram illustrating an exemplary implementation of the noise management unit that accounts for spatial gain variation due to vignetting correction.

FIG. 7 is a diagram illustrating an exemplary implementation of a noise management unit that accounts for spatial gain variation due to vignetting correction. The noise management unit 700 may include three multipliers 702, 704 and 706. Inputs to the noise management unit 700 include the combined noise level for each of the channels, σcomb_R, σcomb_G, σcomb_B, and the $\eta_{foc}(x,y)$ spatial gain setting at position (x, y) in the array produced by the vignetting correction 414. Each combined noise level σcomb_R, σcomb_G, σcomb_B, is input to a respective one of the multipliers 702, 704 and 706 and multiplied by $\eta_{foc}(x,y)$ to produce the noise adaption threshold 708 for each of the channels.

The inaccuracy associated with the linearization step may be addressed by increasing the complexity of the noise management scheme. If the particular image sensor shows nonlinearity (especially in the low counts), error will still be present in the establishment of noise adaptive thresholds.

A further aspect of the exemplary embodiment adjusts the noise levels and the noise adaptive thresholds 432 based on the gain associated with any nonlinearity of the image sensor. In one embodiment, a LUT may be included in the noise management unit 428 that contains gain mappings as opposed to pixel range mappings as found in the linearization LUT. It would be possible to dynamically account for variations due to nonlinear response of the pixel data in addition to the spatially varying gain associated with the vignetting correction.

Figure 8:
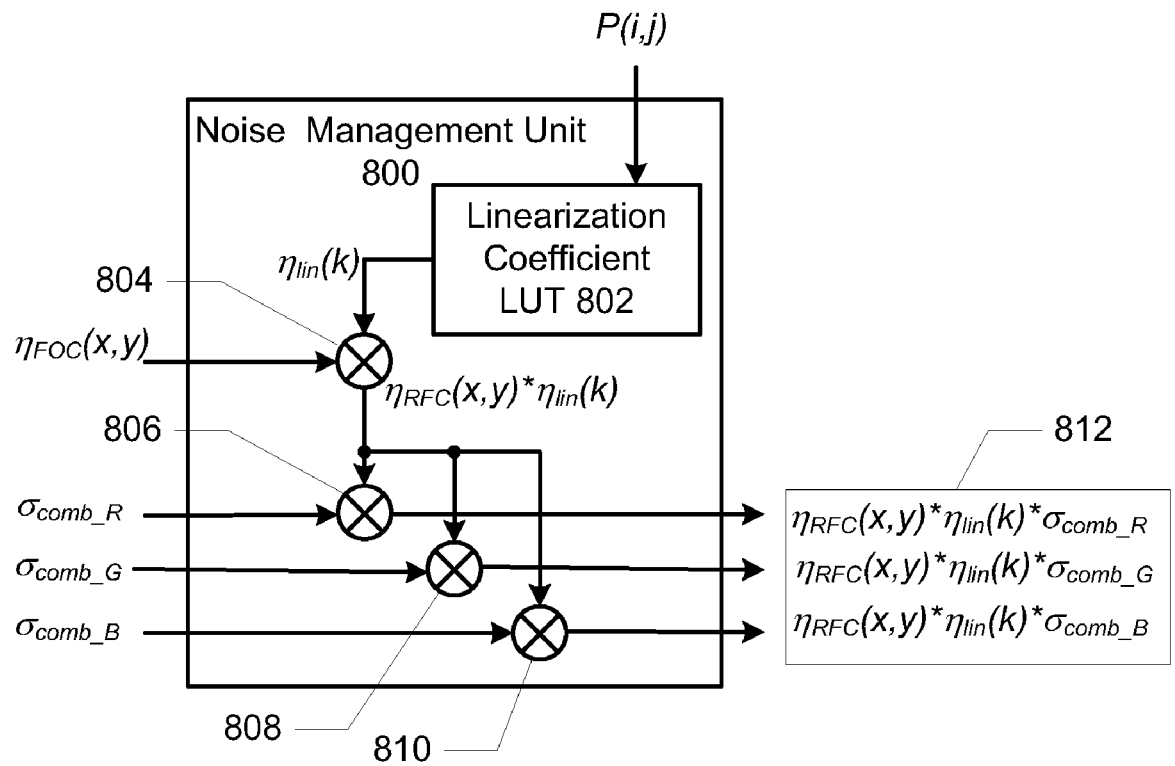
FIG. 8 is a block diagram illustrating an exemplary implementation of the noise management unit that accounts for spatial gain variation due to vignetting correction and level variation due to linearization.

FIG. 8 is a block diagram illustrating an exemplary implementation of the noise management unit that accounts for spatial gain variation due to vignetting correction and level variation due to linearization. The noise management unit 800 may include a linearization coefficient lookup table (LUT) 802 and four multipliers 804, 806, 808 and 810. Inputs to the noise management unit 800 may include a spatial position in the array P(i,j), the combined noise level for each of the channels, σcomb_R, σcomb_G, σcomb_B, and the $\eta_{foc}(x,y)$ spatial gain setting at position (x, y) in the array.

In operation, P(i,j) is used as an index the linearization coefficient LUT 802 to retrieve an intensity gain $\eta_{lin}(k)$ representing the ratio of (value input)/(value output) for a pixel value input of k. The intensity gain $\eta_{lin}(k)$ is input to multiplier 804 and multiplied with the $\eta_{foc}(x,y)$ spatial gain setting by multiplier 804. Output of multiplier 804 is input to multipliers 806, 808 and 810 and multiplied with respective ones of the combined noise level for each of the channels, σcomb_R, σcomb_G, σcomb_B. The output of each of the multipliers 806, 808 and 810 is the noise adaption threshold 812 for each of the channels.

Further details regarding calculation of the dark pixel statistics 42 will now be described. Referring again to FIG. 5, there are two measurements which are obtained from the dark pixel region 606. The average value for the dark noise, and the mean deviation of the dark noise.

The average value of the dark noise is used to provide the dark level for the black level clamp (BLC) 410, and the mean deviation is used to establish the noise adaptive thresholds for the edge adaptive algorithms in the spatial processing group 24. The use of both analog and digital gain settings to maximize the use of the A/D in the read chain of the CMOS sensor defines a requirement to support multiple channels for this measurement. The average dark value for each of the color channels are supported through collection of the dark pixels into three channel summations, $DSUM_R$, $DSUM_G$, and $DSUM_B$, which may be stored in registers. These registers may be read by software and divided by the appropriate pixel count for support of a manual BLC mode. The channel summations, $DSUM_R$, $DSUM_G$, and $DSUM_B$ may be calculated as follows:

$$DSUM_R = \sum_{i=0}^{HSIZE} \sum_{j=0}^{PY0} DP_R(i,j) + \sum_{i=0}^{PX0} \sum_{j=PY0+1}^{PY1} DP_R(i,j) +$$
$$\sum_{i=PX1}^{HSIZE} \sum_{j=PY0+1}^{PY0} DP_R(i,j) + \sum_{i=0}^{HSIZE} \sum_{j=PY1+1}^{VSIZE} DP_R(i,j)$$

$$DSUM_G = \sum_{i=0}^{HSIZE} \sum_{j=0}^{PY0} DP_G(i,j) + \sum_{i=0}^{PX0} \sum_{j=PY0+1}^{PY1} DP_G(i,j) +$$
$$\sum_{i=PX1}^{HSIZE} \sum_{j=PY0+1}^{PY0} DP_G(i,j) + \sum_{i=0}^{HSIZE} \sum_{j=PY1+1}^{VSIZE} DP_G(i,j)$$

$$DSUM_B = \sum_{i=0}^{HSIZE} \sum_{j=0}^{PY0} DP_B(i,j) + \sum_{i=0}^{PX0} \sum_{j=PY0+1}^{PY1} DP_B(i,j) +$$
$$\sum_{i=PX1}^{HSIZE} \sum_{j=PY0+1}^{PY0} DP_B(i,j) + \sum_{i=0}^{HSIZE} \sum_{j=PY1+1}^{VSIZE} DP_B(i,j)$$

where $DP_R(l,j)$, $DP_G(l,j)$, and $DP_B(l,j)$ represent the dark shielded pixels at location (i,j) corresponding to a red, green, or blue location within the mosaic pattern.

In the above equations, all of the pixels may be measured in order to measure the mean. In an alternative embodiment, the mean may be measured within a specific region of pixels, e.g., where significant fixed pattern noise is present. In yet a further embodiment, the dark pixel statistics may be obtained by covering the entire sensor and creating a matrix of gain and exposure settings.

In yet another embodiment, the dark pixel statistics could be pre-measured during calibration. In this embodiment, the noise management system may not read the dark pixel statistics in real-time, but instead read a calibration file by a noise manager routine. The noise manager routine could use the same information as described above, but in the information may be stored in a table that is indexed by the analog gain settings. The table can be obtained during the manufacturing process and stored in memory. This embodiment would lend a software solution operating on the ISP output. This table could be used along with the FOC table to implement a more sophisticated second stage post noise processing algorithm.

In addition to the manual BLC mode, the statistics collection unit 20 of the exemplary embodiment may also provide the capability for estimating the mean dark noise for each channel by maintaining a count and providing a scaled value into a second set of registers. Once the mean value of the dark current is estimated for each channel, it is possible to also estimate the mean deviation which can then be further processed under software control to establish noise thresholds for adaptive algorithms or applied directly to the generation of noise/edge thresholds as the mean deviation instead of the standard deviation which requires a square root.

Figure 9:
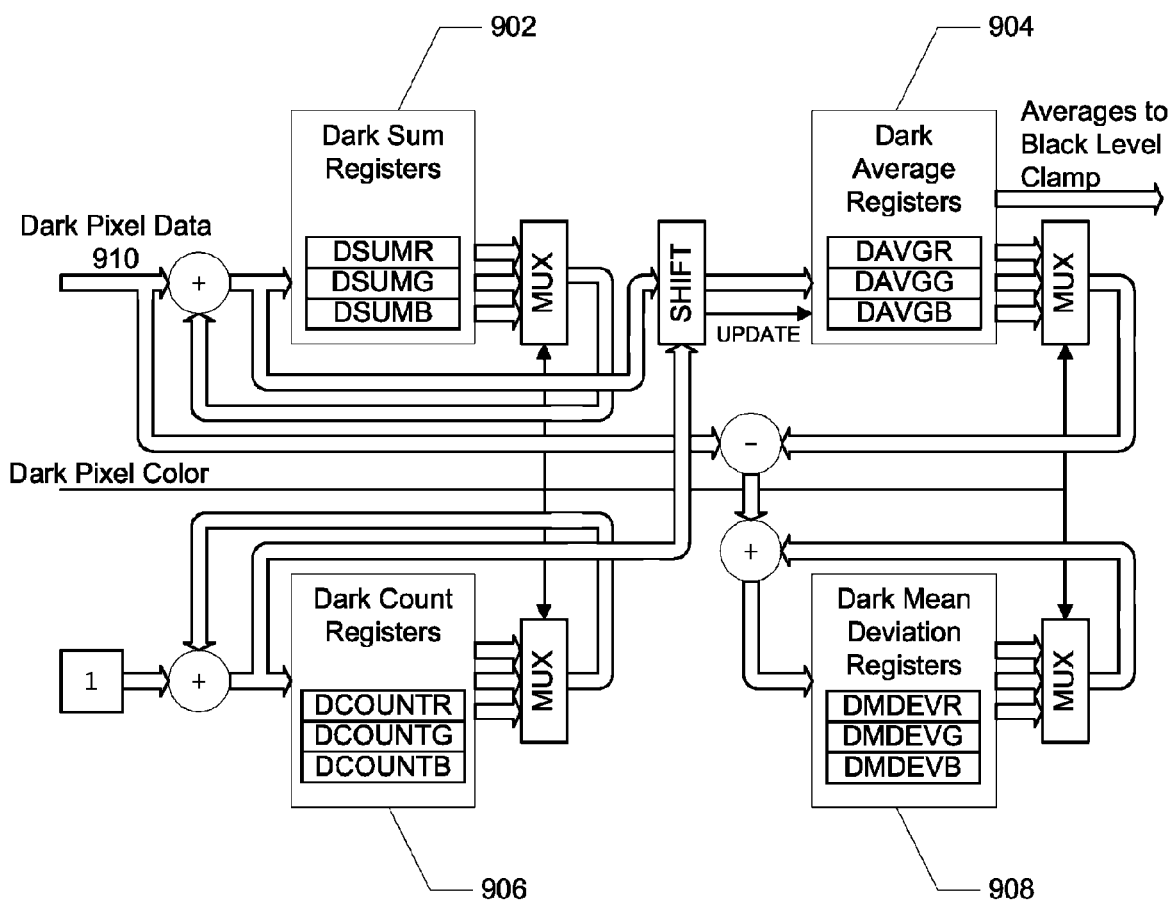
FIG. 9 is a block diagram illustrating one embodiment for the statistics collection unit.

FIG. 9 is a block diagram illustrating one embodiment for the statistics collection unit. The statistics collection unit 900 may include dark sum registers 902, dark average registers 904, dark count registers 906, and dark mean deviation registers 908. Dark pixel data 910 is input from capture and the sums of the dark pixel values are accumulated via an adder and collected in three dark sum registers 902, DUM_R, DSUM_G, and DSUM_B. The dark sum registers 902 may be read under software control and a right shift may be applied to the dark sum registers depending on the number of pixels which have been accumulated at any time. The result of the right shift is to create an average dark level every power of two pixels of each channel, which are collected in the dark average registers, DAVG_RGB. For example, the DAVG is updated after every 2, 4, 8, 16, 32, 64 . . . pixel of each channel being received. The DAVG values may be applied to an automatic black level clamp (BLC) function once the first active pixel is reached. The ability to automatically update the BLC allows the system to be more robust and adapt to the user environment. Once the dark average has been calculated, it is also possible to calculate the mean deviation, which is collected in the dark mean deviation registers 908 DMDEV_RGB. In the exemplary embodiment, the mean deviation begins to be updated after the first DAVG value is available.

The use of the DAVG value for the R, G, and B channels allows the dark current, or the DC component of the fixed pattern noise to be removed from the pixel data stream. The DAVG values are obtained by shifting the running DSUM values by the value present in the DCOUNT registers 906. The DCOUNT registers 906 provide a count of the dark pixels which have been passed through the statistics unit. The DMDEV value for each of the channels provides the basis for managing the noise and noise adaptive thresholds within the spatial processing group 24.

A method and system for noise management for spatial processing in digital image/video capture systems has been disclosed. The present invention has been described in accordance with the embodiments shown, and there could be variations to the embodiments, and any variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Accordingly, many modifications may be made by one of ordinary skill in the art without departing from the spirit and scope of the appended claims.

We claim:

1. A method, comprising:
   measuring noise levels of pixel data;
   adjusting the noise levels with at least one of an intensity gain setting, a spatial gain setting, and a global gain setting to calculate noise adaptive thresholds for use during spatial processing of the pixel data; and
   outputting the noise adaptive thresholds to edge adaptive algorithms, wherein the edge adaptive algorithms comprise at least one of cross talk reduction, color synthesis, color management, and edge adaptive spatial filtering.

2. The method of claim 1, further including calculating the noise adaptive thresholds by combining the intensity gain setting, the spatial gain setting, and the global gain setting with dark pixel statistics.

3. The method of claim 2 further including reading the dark pixel statistics in one of real-time and from a calibration file.

4. The method of claim 2 further including combining the dark pixel statistics with the global gain setting and the intensity gain setting to create combined noise levels, and multiplying the combined noise levels by the spatial gain setting.

5. The method of claim 4 wherein the combined noise levels comprises a separate combined noise level calculated for each R, G, and B channel of the pixel data, and a separate noise adaptation threshold is calculated for each of the R, G, and B channels of the pixel data.

6. The method of claim 1, wherein the intensity gain setting is used during linearization correction, the spatial gain setting is used during vignetting correction, and the global gain setting is used by automatic white balance (AWB) and automatic exposure (AE) processes.

7. The method of claim 1, further including adjusting the noise levels and the noise adaptive thresholds based on a gain associated with nonlinearity of an image sensor.

8. A method, comprising:
measuring noise levels of pixel data;
adjusting the noise levels with at least one of an intensity gain setting, a spatial gain setting, and a global gain setting to calculate noise adaptive thresholds for use during spatial processing of the pixel data; and
measuring the noise levels by calculating dark pixel statistics associated with dark pixel values of an image sensor, wherein the dark pixel statistics include at least one of a mean deviation, a standard deviation, and/or a variance of the dark pixel values.

9. The method of claim 8 further including calculating the noise adaptive thresholds as a product of the dark pixel statistics, the global gain setting, the intensity gain setting, and the spatial gain setting.

10. The method of claim 9 further including calculating the noise adaptive thresholds prior to initiating an image capture.

11. The method of claim 8 further including calculating the noise adaptive thresholds by,
calculating combined noise levels as a product of pixel statistics, the global gain setting, and the intensity gain setting prior to image capture; and
calculating the noise adaptive thresholds as a product of the combined noise levels and the spatial gain setting.

12. The method of claim 11 further including calculating the noise adaptive thresholds after image capture.

13. The method of claim 11 wherein the combined noise levels comprise a combined noise level for each of R G and B channel that are calculated as a product of a global automatic exposure (AE) gain, analog and digital automatic white balance (AWB) gains for each of the R G and B channels, the intensity gain, and the standard deviation of the dark pixel values for each of the R G and B channels.

14. A noise management system, comprising:
a statistics collection unit that measures noise levels of pixel data; and
a noise management unit that adjusts the noise levels with at least one of an intensity gain setting, a spatial gain setting, and a global gain setting to calculate noise adaptive thresholds for use during spatial processing of the pixel data, and wherein the noise management unit outputs the noise adaptive thresholds to edge adaptive algorithms, wherein the edge adaptive algorithms comprise at least one of cross talk reduction, color synthesis, color management, and edge adaptive spatial filtering.

15. The noise management system of claim 14, wherein the noise management unit calculates the noise adaptive thresholds by combining the intensity gain setting, the spatial gain setting, and the global gain setting with dark pixel statistics.

16. The noise management system of claim 15 wherein the dark pixel statistics are read in one of real-time and from a calibration file.

17. The noise management system of claim 15 wherein the noise management unit combines the dark pixel statistics with the global gain setting and the intensity gain setting to create combined noise levels, and multiplies the combined noise levels by the spatial gain setting.

18. The noise management system of claim 17 wherein the combined noise levels comprises a separate combined noise level calculated for each R, G, and B channel of the pixel data, and a separate noise adaptation threshold is calculated for each of the R, G, and B channels of the pixel data.

19. The noise management system of claim 14, wherein the intensity gain setting is used during linearization correction, the spatial gain setting is used during vignetting correction, and the global gain setting is used by automatic white balance (AWB) and automatic exposure (AE) processes.

20. The noise management system of claim 14, wherein the noise management unit further adjusts the noise levels and the noise adaptive thresholds based on a gain associated with nonlinearity of an image sensor.

21. A noise management system, comprising:
a statistics collection unit that measures noise levels of pixel data, wherein the statistics collection unit measures the noise levels by calculating dark pixel statistics associated with dark pixel values of an image sensor, wherein the dark pixel statistics include at least one of a mean deviation, a standard deviation, and/or a variance of the dark pixel values; and
a noise management unit that adjusts the noise levels with at least one of an intensity gain setting, a spatial gain setting, and a global gain setting to calculate noise adaptive thresholds for use during spatial processing of the pixel data.

22. The noise management system of claim 21 wherein the noise management unit calculates the noise adaptive thresholds as a product of the dark pixel statistics, the global gain setting, the intensity gain setting, and the spatial gain setting.

23. The noise management system of claim 22 wherein the noise management unit calculates the noise adaptive thresholds prior to initiating an image capture.

24. The noise management system of claim 21 wherein the noise management unit calculates the noise adaptive thresholds by,
calculating combined noise levels as a product of pixel statistics, the global gain setting, and the intensity gain setting prior to image capture; and
calculating the noise adaptive thresholds as a product of the combined noise levels and the spatial gain setting.

25. The noise management system of claim 24 wherein the noise management unit calculates the noise adaptive thresholds after image capture.

26. The noise management system of claim 24 wherein the combined noise levels comprise a combined noise level for each of R G and B channel that are calculated as a product of a global automatic exposure (AE) gain, analog and digital automatic white balance (AWB) gains for each of the R G and B channels, the intensity gain, and the standard deviation of the dark pixel values for each of the R G and B channels.

* * * * *